Jan. 9, 1968         O. H. WEHRMANN         3,362,663

REDUCTION OF TURBULENCE AND DRAG BY MECHANICAL VIBRATIONS

Filed March 23, 1966

INVENTOR.
OTTMAR H. WEHRMANN
BY

ATTORNEY

United States Patent Office 3,362,663
Patented Jan. 9, 1968

3,362,663
REDUCTION OF TURBULENCE AND DRAG
BY MECHANICAL VIBRATIONS
Ottmar H. Wehrmann, Bellevue, Wash., assignor to The
Boeing Company, Seattle, Wash., a corporation of
Delaware
Filed Mar. 23, 1966, Ser. No. 536,698
5 Claims. (Cl. 244—130)

ABSTRACT OF THE DISCLOSURE

A compliant wall (piezoelectric preferred) is inserted in a surface experiencing boundary layer laminar fluid flow and a first constant-temperature hot-wire anemometer for sensing velocity fluctuations occurring in the boundary layer is placed downstream of the compliant wall and electrically connected so as to vibrate the compliant wall at an amplitude to maintain the anemometer temperature constant during variations in fluid flow. A second constant-temperature hot-wire anemometer connected to a visicorder display measures the amplitude of velocity fluctuations in the flow across the compliant body so a human operator can move the first anemometer along the flow of fluid in order to minimize the amplitude of the velocity fluctuations.

---

This invention relates to apparatus for solving dynamic problems and more particularly to apparatus reducing boundary layer induced skin friction and hydrodynamic perturbations through structural surfaces which form part of an object or vehicle created by the object or vehicle moving through a fluid medium or a fluid medium flowing over the object or vehicle, and minimizing the energy radiated from a rigid or vibrating surface or body with concomitant reduction of the energy level of the excitation perturbation.

The effect of a compliant wall on the transition from laminar to turbulent flow has been treated by Kramer, Brooke-Benjamin, Landahl and Hains. Experiments in water by Kramer indicated that significant skin friction drag reduction can be achieved by flexible surface coatings. The drag reduction may be possible either by (1) delaying the transition through stabilization of the laminar boundary layer oscillations (Tollmien-Schlichting waves), or (2) lowering the turbulent shear stresses (Reynolds stresses) through alleviation of the turbulent pressure fluctuations. Kramer's explanation of the cause of the reduced drag was that the flexible material damped out the Tollmien-Schlichting waves in the laminar boundary layer thus delaying transition to turbulent conditions. According to Kramer's design concept, the elastic characteristics of a skin structure over which fluid flows are chosen so that the propagation velocity of surface waves in the skin coincides with the velocity of the most unstable Tollmien-Schlichting waves. In this case the internal damping of the skin takes over the role of viscosity in stabilizing the Tollmien-Schlichting waves. B. Benjamin formulated another design concept according to which the flexible skin should be both soft (to have a large response to surface pressures) and also light (to keep the wave propagation velocity in the skin greater than the Tollmien-Schlichting wave velocity), and at the same time it should have very little internal damping.

According to the teachings of this invention, vibrations of such a compliant wall material are induced by external means and the frequency of vibrations is adjustable without changing the Reynolds number characteristic of the fluid flowing at some velocity U or the size of the compliant wall. This requirement is satisfied by making the compliant wall out of a piezoelectric material whose shape depends on an applied voltage. The amplitude and phase of the vibrations of the compliant wall are adjustable with reference to the amplitude and phase of the velocity fluctuations in the boundary layer of the fluid flow. In this manner the amplitude of the latter velocity fluctuations are reduced thus delaying the onset of turbulence, or reducing turbulence once it has been established. This latter adjusting requirement is satisfied by the use of a special electronic feedback system according to the teachings of this invention.

Therefore, an object of this invention is to reduce frictional drag, energy radiation, transmission of perturbation energy, and structural fatigue created by an object being exposed to an established turbulent flow of fluid.

A further object of this invention is to provide for an object to be located in an established turbulent flow of fluid while substantially reducing the problems created by such flow, and simultaneously reducing the turbulence thereof.

Another object of this invention is to provide a vehicle with layers of material attached to the exterior skin thereof to reduce the problems created by an established turbulent flow of fluid thereover.

Another object of this invention is to provide a skin structure including a layer of substantially rigid material and a layer of compliant material which functions when attached to an object located in an established turbulent flow to reduce the frictional drag, energy radiation, and hydrodynamic energy transmission, and structural fatigue created by such turbulent flow across said object.

Another object of the invention is to provide external means for inducing vibration in a compliant wall disposed in a turbulent flow of fluid so that the frequency of vibrations can be adjustable without changing the Reynolds number of the fluid flow or the size of the compliant material.

A still further object of the instant invention is to provide means for adjusting the amplitude and phase of the vibrations induced in the compliant wall with reference to the amplitude and phase of the velocity fluctuations of the turbulent fluid flowing thereover.

These and other objects of the invention not specifically set forth above will become readily apparent from the accompanying description and drawings in which:

FIG. 1 graphically shows a velocity profile across a compliatn wall of a fluid having flow and a turbulent boundary layer;

Adherence of fluid particles to the surface of a body moving in a contiguous fluid results in the formation of what is known as a boundary layer. The nature of this boundary layer along the surface or a body, e.g., along the surface of a ship in motion or an aircraft in flight, is a controlling factor in the magnitude of the skin friction or drag. Where the boundary layer is flowing smoothly, or laminar, the skin friction or drag is generally low. However, where this boundary layer is agitated or turbulent, the drag on the object in the fluid is considerably increased.

One of the prime objectives of aerodynamic and hydrodynamic research has been, and still is, to prevent this boundary layer from becoming turbulent; that is, to maintain laminar boundary layer flow adjacent to the surfaces of the object. The problem in general is described as boundary layer stabilization.

Boundary layer stabilization will improve the performances of subsonic and supersonic aircraft by reducing frictional drag across an airfoil.

Boundary layer stabilization is also critical in the transmission of fluid through a pipe or duct wherein the relative motion between the fluid and the interior of the pipe or duct creates agitation or turbulence similar to that created by an object moving through a fluid, as stated above.

Various devices have been developed in the past to attempt to stabilize the laminar boundary layer by delaying the onset of turbulent flow, the more recent being described in British Patents No. 848,304 and No. 881,570. However, once turbulent boundary layer conditions are established along the surface of an object or body, the problem is as great as though the turbulent flow had not been delayed, hence a solution to the following problems remained unsolved for the turbulent boundary layer condition; namely, (1) reducing boundary layer induced skin frictional drag; (2) minimizing the transmission of acoustic and hydrodynamic perturbation energy into or through the body; (3) reducing energy radiated from vibrating structures; and (4) reducing fatigue damage to structures normally exposed to acoustic and hydrodynamic perturbations.

Figure 1:
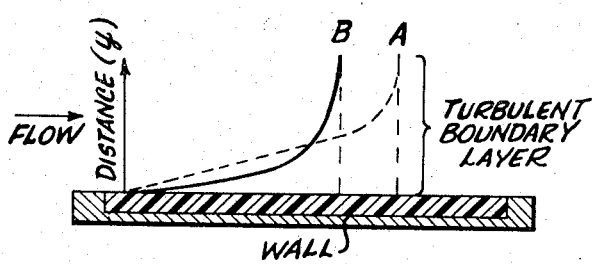

Referring to FIG. 1, two curves A and B are designated. The present invention is based on the discovery that applying a layer of compliant material to a surface of an object over which a fluid is moving at a relative velocity to the object, such as the substantially rigid skin of an aircraft, will itself substantially reduce each of the problems set forth directly above when the said surface is exposed to an established turbulent flow; and will also result in a reduction of the intensity of the turbulence about the surface. By additionally inducing vibrations to the layer of compliant material, according to the teachings of this invention, so that the induced vibrations have a predetermined frequency and amplitude, the instant invention solves in an efficient and effective manner a long sought method of overcoming the problems of turbulent boundary layer conditions by reducing the above-stated effects by as much as 20% and probably more with additional development.

The instant invention, when applied to conditions represented by curve A of FIG. 1, is based on the principle of producing an overall boundary layer energy level which is lower than would be generated at the surface of a hard wall by transferring excess energy into a frequency range which has a higher rate of dissipation. The compliant material modifies the velocity profile in a turbulent boundary layer and thereby reduces the skin friction or drag. For a constant mass fluid flow, the compliant material reduces the slope of the velocity profile at the boundary layer as seen with reference to FIG. 1. In FIG. 1 the curve A represents the velocity profile due to fluid flow at a constant mass over a hard surface; the curve designated B represents the velocity profile of a fluid flow over a compliant surface. Therefore, as is seen, since the slope of the curve B velocity profile is less than the slope of the curve A velocity profile, the frictional drag of fluid along the compliant surface will be lower than the frictional drag across a hard wall.

Figure 2:
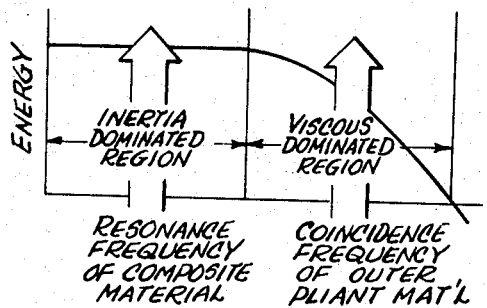
FIG. 2 shows a boundary layer energy spectrum of a fluid having flow.

The energy level, represented in FIG. 2, at a wall disposed in a fluid flow which creates a turbulent boundary layer is determined by low frequency inertia dominated forces. Above this region energy is dominated by viscous effects and has a greater rate of dissipation.

Continuing with reference to FIG. 2, the compliant material is designed to produce an over-all boundary layer energy level lower than would be generated at the surface of a hard wall and transfer this energy into a frequency range which has a high rate of dissipation. This performance is achieved in the following manner: Energy from the compliant wall is transmitted by vibration of the wall to the turbulent boundary layer. The compliant material is designed to have a low resonance frequency and a high internal damping. The resonance frequency corresponds to a mid-frequency point in the inertia dominated region of the boundary layer energy spectrum, as shown in FIG. 2. In addition, according to the teachings of this invention, the compliant material is disposed in combination with vibration induction means as will be discussed with reference to FIG. 3. By the use of the vibration induction means, at an energy frequency high in the viscous region of the boundary layer energy spectrum, as seen in FIG. 2, the surface flexural wave velocity is made to correspond to the conduction velocity of the boundary layer pressure field. In addition, the frequency and amplitude of vibration of the compliant material corresponds to the frequency and amplitude of the fluid flow across the surface. Thus the remaining energy in the turbulent boundary layer is transferred by hydrodynamic coincidence to this high frequency region and dissipates. Hydrodynamic coincidence occurs when the conduction velocity of the boundary layer pressure field is the same as the induced flexural wave velocity of the compliant material. The compliant material responds to the induced pressure fluctuations in the manner of a uniformly distributed, viscously damped compression spring. The deflection of such a spring will effectively dissipate a portion of the oscillatory energy of the fluid flow that would otherwise expend itself in the generation of turbulence. The deflection further contributes to the effectiveness of the structure by opposing the development of local pressure gradients in the boundary layer and hence help to maintain the dynamic equilibrium characteristics of laminar flow. Therefore, attenuation of acoustic or hydrodynamic perturbation energy through the structure is achieved.

Figure 3:
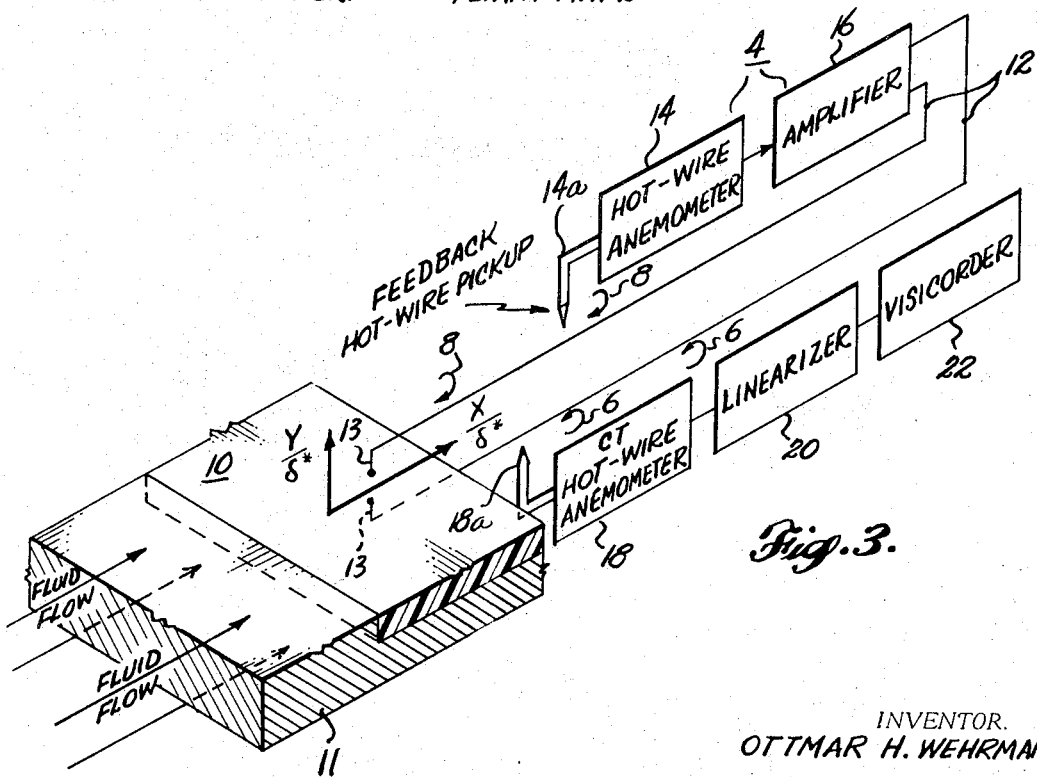
FIG. 3 shows an embodiment of the instant invention in accordance with the teachings of this invention.

Referring to FIG. 3, a complaint material 10 (e.g., a piezoelectric plate) is shown disposed within the path of a flowing fluid and attached to a solid body or rigid structure 11. Although the embodiment of FIG. 3 displays material 10 downstream of solid body 11 and attached thereto, it is to be understood that material 10 can also function, according to the teachings of this invention, attached to solid body 11 upstream or both upstream and downstream of body 11. Additionally, FIG. 3 is intended to be illustrative only of many possible configurations. For example, an airfoil wherein the airfoil is formed of solid body 11 and many pieces of material 10 attached to solid body 11 both on the upper and lower surfaces of the airfoil. The flowing fluid is of a velocity sufficient to produce velocity fluctuations in the fluid while having motion relative to the compliant piezoelectric 10. Circuit means 12 and electrodes 13 interconnect the compliant piezoelectric 10 and a sensing means 14 (supported by means not shown) such as a constant-temperature, hot-wire anemometer 14. The hot-wire anemometer 14, including a sensing means pickup 14a, having been calibrated under steady fluid flow conditions, forms in part a feed-back system 4. The sensing output of the anemometer 14 is in terms of current required to maintain the temperature of anemometer 14 constant under non-steady fluid flow conditions. A second sensing means 18 such as constant temperature hot-wire anemometer 18 is supported and disposed in combination with piezoelectric 10 (by means not shown) to measure, by sensing means pickup 18a, after calibration under steady fluid flow conditions, the amplitude of velocity fluctuations in the non-steady fluid flow across piezoelectric 10. The position of anemometer sensing means pickup 18a can be varied along the vortex street represented by reference numerals 6 and 8. It is the amplitude of the velocity fluctuations or vortices 6 and 8 that anemometer 18 measures. Circuit means connect anemometer 18 to a linearizer 20 and graphic means 22 such as a visicorder 22. The output of anemometer 18 is linearized by linearizer 20 and fed to recorder means or visicorder 22. In this manner the actual variations in the amplitude of velocity fluctuations of the fluid flow can be evaluated. As is clear with reference to FIG. 3, anemometer sensing pickup 14a also measures amplitude of the velocity fluctuations of vortices 6 and 8; the output of anemometer 14 is fed by circuit means to amplifier 16 which with circuit means 12 and anemometer 14 forms vibration inducing means or feedback system 4. Amplifier 16, in response to the output of anemometer 14, drives piezoelectric plate 10 to vibration by feeding current to electrodes 13 along circuit means 12. Thus the amplitude of piezoelectric 10 vibration is controlled by amplifier 16 which in turn responds to measured output from anemometer 14. By evalution of visicorder 22 output, a significant reduction in the amplitude of the velocity fluctuation of vortices 6 and 8 is realized whenever piezoelectric 10 is driven to vibrate in phase with the velocity fluctuations of traveling vortices 6 and 8. Since such reduction increases laminar flow and thereby reduces drag forces exerted on the fluid passing over plate 10, it is necessarily desirable to achieve a in-phase relationship between the vibrations of plate 10 and the velocity fluctuation of vortices 8 and 6. The phase of the piezoelectric 10 vibrations with reference to the traveling vortices 8 and 6 is varied by changing the position of the sensing means pickup 14a of anemometer 14 along the vortex street. Thus, by observing the visicorder 22 evaluation, means (not shown) can be manually or automatically employed to vary the position of anemometer 14 until maximum reduction of vortices 6 and 8 velocity flow fluctuations are realized.

In operation, the embodiment of FIG. 3 functions to reduce velocity fluctuations occurring in the boundary layer of a fluid having motion relative to an object such as compliant member 10. The amplitude of the velocity fluctuations is sensed by sensing means pickup 18a of anemometer 18, and by means of linearizer 20 and visicorder 22, presented in graphic form to an operator or automatic control means (not shown). Using the graphic information from visicorder 22, the sensing means pickup 14a of anemometer 14 is translated along the vortex street represented by vortices 6 and 8. Translation is made in the direction which will cause a reduction in the velocity fluctuations of vortices 6 and 8; the graphic means 22 monitors for this reduction. The reduction is achieved in translating the sensing means pickup 14a of anemometer 14 since the phase of the induced vibrations in member 10 is controlled by the position of the sensing means pickup 14a along the vortex street. The output of anemometer 14 to amplifier 16 controls the amplitude of the induced vibrations. Maximum reduction is achieved when the magnitude of the amplitude of vibrations induced in member 10 approaches the magnitude of the amplitude of velocity fluctuation of vortices 6 and 8, and when the phase of the induced vibrations is in phase with the velocity fluctuations.

The embodiment of FIG. 3 has been operated experimentally in the laboratory and performs satsfactorily. In order to perform an experiment to investigate the influence of the embodiment in FIG. 3, two modifications of the embodiment of FIG. 3 were made. First, in order to generate a single frequency of velocity fluctuation, for matter of convenience, in the fluid flow boundary layer, and thereby induce turbulence, a ribbon or taut copper wire (not shown) disposed to be vibrated within the path of fluid flow was inserted at the boundary layer anterior to the leading edge of piezoelectric plate 10. The longitudinal coordinate or distance from the leading edge is represented in FIG. 3 by the symbol X. The generation of a single frequency of velocity fluctuation in the fluid flow is convenient for experimental purposes since the boundary layer at a certain distance behind the leading edge of the piezoelectric plate 10 becomes unstable for a determined frequency range with resulting different amplitudes and different phase velocities. By the use of a single frequency induced, these latter difficulties are controlled. Secondly, no homogeneous material combining the correct strength and elastic properties was found which could generate a traveling surface wave on the surface of flexible wall (piezoelectric 10) with the required propagation velocity. Therefore, an active wall 10 was built to simulate a propagating wave using a number of small elements or piezoelectric crystals (not shown) capable of vibrating with a stepwise increasing phase relation in the direction of flow. This active wall is shown in FIG. 3 as the piezoelectric plate 10. The wavelength, propagation speed, amplitude and phase of the wall vibrations can thereby be adjusted with applied potentials to electrodes 13 from anemometer 16 to correspond to the same boundary conditions induced into the fluid boundary layer by the copper wire.

The experiment was performed in a low turbulence wind tunnel. The hard and rigid airfoil section, plate 11, has a length of 360 cm., a thickness of 1.25 cm. and the leading edge is rounded by milling a radius of .24 cm. At a distance of 77 cm. behind the leading edge, the vibrating ribbon or taut copper wire was installed (not shown). Immediately behind the ribbon the rigid airfoil section was replaced by piezoelectric plate 10, consisting of ten vibrating piezoelectric elements covered with a thin aluminum mylar sheet (not shown) having dimensions 12.5 x 12.5 cm. The free-stream velocity of the fluid at the leading edge was 770 cm. per second and the wave generated in the flowing fluid by the vibrating ribbon was 51 cycles per second, having a wavelength of 4.2 cm. Because every element of the flexible wall 10 is 0.42 cm. wide and ten or more elements are needed to have a certain resolution of the propagating wave, it is not necessary to generate shorter wavelengths. In addition, only multiples of the .42 cm. wavelengths are reproduced.

The amplitude of the velocity fluctuations in the boundary layer of a fluid flow across a rigid wall has been measured by various investigators such as Schubauer, Klebanoff, and Kovasznay and agrees with the predictions of the theory. The amplitude of velocity fluctuations increases with increase in distance in a normal direction from the leading edge of the rigid plate 11 with a first maximum at $y/\delta^* = .3$, then decreases to zero at $y/\delta^* = .8$ and reaches a second, lower maximum at $y/\delta^* = 1$, where $y$ is the normal coordinate of distance measured upward from the surface of rigid plate 11 and $\delta^*$ the fluid boundary layer displacement thickness. The above relationship was confirmed for the rigid wall in the present experiment.

By causing electrodes 13 to induce vibration in the piezoelectric wall 10 at an amplitude in the order between $10^{-4}$ and $10^{-5}$ cm. or with a velocity amplitude of $3.15 \times 10^{-2}$ to $10^{-3}$ cm. per second, the portion of the boundary layer between $y/\delta^* = 0$ and $y/\delta^* = .18$ could be influenced. The fluctuations in this part of the boundary layer could be increased or reduced depending on the phase relation between the induced velocity fluctuations in wall 10 and the velocity fluctuations in the fluid boundary layer. In the case where the velocity fluctuations in the fluid boundary layer and the induced vibrations (velocity fluctuations) in the wall 10 are in phase, a drastic reduction of the velocity fluctuations in the fluid boundary layer was accomplished. For example, when the Reynolds number characteristic of the fluid flow was maintained over the rigid plate 11 and piezoelectric wall 10 at approximately 1600 (Re=1600) by controlling the parameters of the expression $$\frac{U \cdot \delta^*}{\nu}$$

related to the boundary layer thickness (where $$U$$

is the local velocity in the fluid boundary layer, $\delta^*$ the boundary layer displacement thickness and $\nu$ the kinematic viscosity of the fluid), the dimensionless frequency of the velocity fluctuations $$\frac{\beta r^\nu}{U_\infty^2} = 80.5 \times 10^{-6}$$

where $\beta$ is equal to $2\pi f$, $f$ being the frequency of the velocity fluctuations, $r$ is a number representing the real part of the frequency phasor, $\nu$ is as defined earlier and $$U_\infty$$

the free stream velocity of the fluid, and the distance between the ribbon (not shown) and hot-wire anemometer 16 is 4.5 cm., the following results were obtained:

| Reduction in fluid boundary layer velocity fluctuations, percent: | $\widetilde{\frac{1}{\delta^*}}$ |
|---|---|
| 100 | $0 < \widetilde{\frac{1}{\delta^*}} < .08$ |
| 50 | $.08 < \widetilde{\frac{1}{\delta^*}} < .12$ |
| 20 | $.12 < \widetilde{\frac{1}{\delta^*}} < .15$ |

In contrast, for a phase relation of 180° out of phase, an increase of the velocity fluctuations was observed.

The over-all reduction of the velocity fluctuations by integrating through the entire δ* of boundary layer was found to be in the order of 10%, which proves that a flexible wall 10, having induced vibrations according to the teachings of this invention, is a practical means for reducing velocity fluctuations in the boundary layer of a fluid flowing across a flexible wall 10.

Although particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

I claim:

1. Apparatus for maintaining a laminar boundary layer at the surface of a solid body under conditions of relative motion between the body and a contiguous fluid where a turbulent boundary layer would otherwise prevail in the absence of said apparatus comprising:
   (a) a compliant material attached to said solid body such that there will be relative motion between said compliant material and the contiguous fluid;
   (b) means for electrically inducing vibrations of a given phase and amplitude in said compliant material in response to a flow-velocity-variation sensing means disposed in combination with said compliant material.

2. Apparatus for the reduction of velocity fluctuations present in a fluid contiguous to a solid body, said fluid having relative motion to said solid body, comprising:
   (a) a piezoelectric material attached to said solid body such that there is relative motion between said piezoelectric material and a contiguous fluid;
   (b) means for electrically inducing vibrations of a given phase and amplitude in said piezoelectric material in response to a flow-velocity-variation sensing means disposed in combination with said piezoelectric material.

3. Apparatus for the reduction of velocity fluctuations present in a fluid contiguous to a solid body, said fluid having relative motion to said solid body, comprising:
   (a) a compliant material attached to said solid body such that there will be relative motion between said compliant material and a contiguous fluid;
   (b) a first constant temperature hot-wire anemometer so disposed in combination with said compliant material that a sensing means pickup of said first constant temperature hot-wire anemometer will be sensitive to velocity fluctuations present in the fluid contiguous to said compliant material;
   (c) circuit means interconnecting said first hot-wire anemometer and means for inducing vibrations in said compliant material;
   (d) a second constant temperature hot-wire anemometer so disposed in combination with said compliant material that a sensing means pickup of said second constant temperature hot-wire anemometer will be sensitive to velocity fluctuations present in the fluid contiguous to said compliant material, said second constant temperature hot-wire anemometer being connected by circuit means to a recorder means which receives the output of said second constant temperature hot-wire anemometer whereby the amplitude and phase vibrations induced in said compliant material can be adjusted in accordance with the output of said recorder means.

4. A method of reducing the frictional drag on an object under conditions of relative motion between the object and a contiguous fluid comprising the steps of:
   (a) inducing vibrations in the object;
   (b) sensing the amplitude of velocity fluctuations present in the contiguous fluid;
   (c) adjusting the phase and amplitude of vibrations induced in the object until the amplitude of velocity fluctuations present in the contiguous fluid is reduced.

5. A method of reducing the frictional drag on an object whose surface area in part comprises a compliant material under conditions of relative motion between the surface area of the object and a contiguous fluid comprising the steps of:
   (a) inducing vibrations in the compliant material;
   (b) sensing the amplitude of velocity fluctuations present in the contiguous fluid;
   (c) adjusting the phase and amplitude of virbations induced in the compliant material until the amplitude of velocity fluctuations present in the contiguous fluid is reduced.

References Cited

UNITED STATES PATENTS

| 2,366,162 | 1/1945 | Vang | 114—67 |
| 3,161,385 | 12/1964 | Kramer | 244—130 |

MILTON BUCHLER, *Primary Examiner.*

B. BELKIN, *Assistant Examiner.*